Patented Jan. 9, 1923.                                                    1,441,844

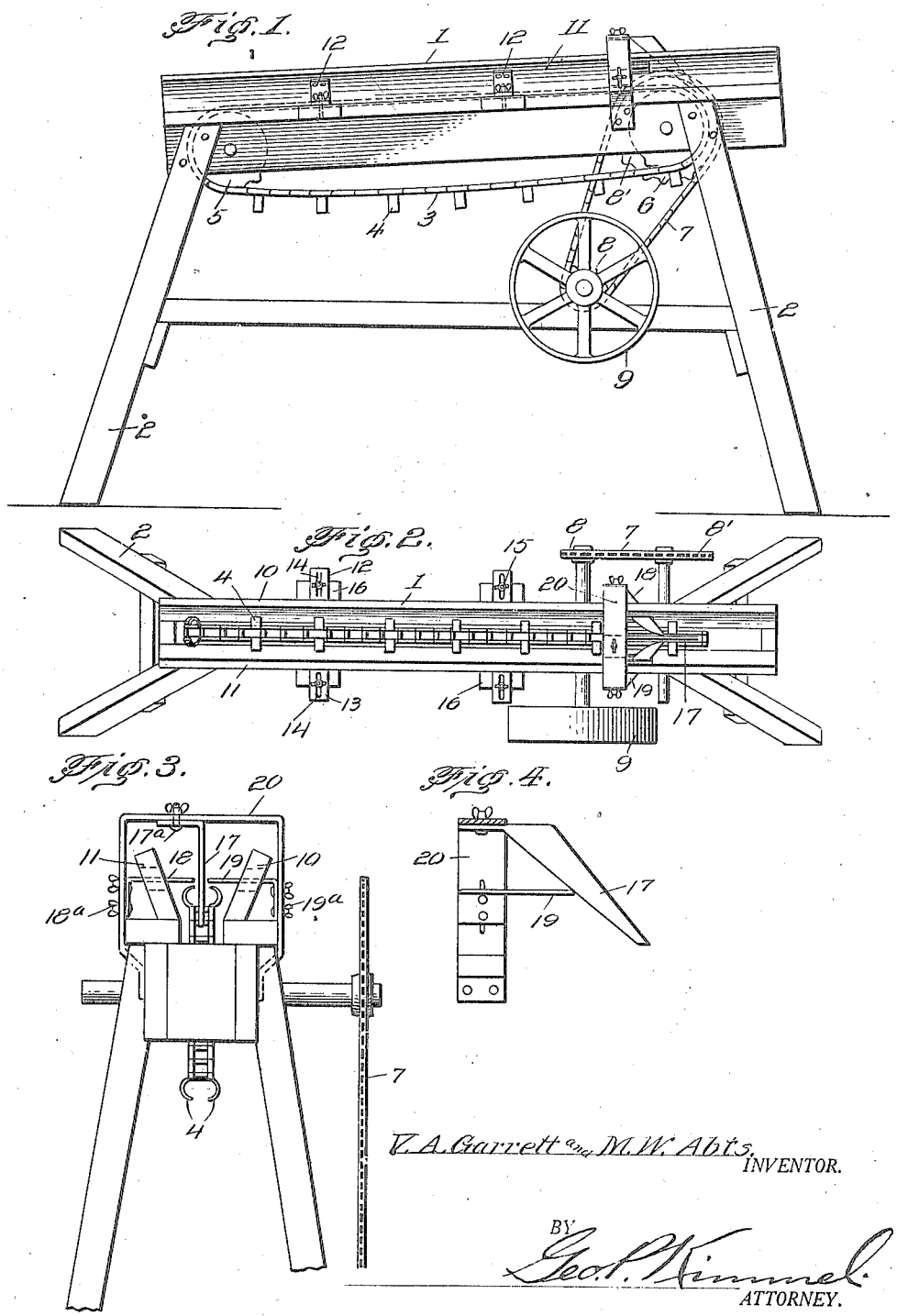

UNITED STATES PATENT OFFICE.

VINCENT A. GARRETT AND METHIAS W. ABTS, OF MORRILL, NEBRASKA.

SEED-POTATO CUTTER.

Application filed June 20, 1921, Serial No. 479,164. Renewed November 24, 1922.

*To all whom it may concern:*

Be it known that we, VINCENT A. GARRETT and METHIAS W. ABTS, citizens of the United States, and residents of Morrill, in the county of Scotts Bluff, State of Nebraska, have invented certain new and useful Improvements in Seed-Potato Cutters, of which the following is a specification.

This invention relates to cutters for seed potatoes and the like.

The object of the invention is to provide a simply constructed and efficient machine for cutting potatoes for seed, also turnips, beets, apples or other vegetables or fruits and which is adjustable for use in connection with vegetables of different sizes.

With these and other objects in view, the invention consists in certain novel features of construction as hereinafter shown, described and claimed.

In the accompanying drawings:—

Figure 1 represents a side elevation of a machine constructed in accordance with this invention.
Fig. 2 is a plan view thereof.

Fig. 3 is an end elevation thereof, and,

Fig. 4 is a detail sectional view through the knife supporting bracket.

The machine constituting this invention, while primarily intended for cutting potatoes for seed obviously may be used for cutting up turnips, beets, apples and the like for feeding stock or for other purposes, and it comprises a trough 1 mounted on a suitable support, legs 2 being here shown supporting it.

Mounted to travel in the bottom of the trough 1 is an endless conveyor in the form of a chain 3 having a plurality of lugs or fingers 4 carried by the links thereof at suitably spaced intervals which are designed to feed the vegetable being cut toward the knives, which are located at the front end of the trough. The vegetables to be cut are fed in at the rear end of the trough preferably by means of a hopper, not shown. The chain 3 is mounted on suitable sprocket wheels 5 and 6 located at the opposite ends of the trough 1 and which are driven by a chain 7 from a power pulley 9 which carries on the shaft thereof a sprocket 8 around which the chain 7 passes. This chain 7 passes over another sprocket 8' carried by the shaft of the sprocket 6, as is shown clearly in Fig. 2, it being of course understood that the pulley 9 may be driven by any suitable power, either manually or otherwise. The chain 3 is of a sufficient length to permit the arrangement or adjustment of the potatoes or other vegetables as they are carried by toward the cutter knives on said chain, it being here shown extending substantially the full length of the trough 1.

The sides 10 and 11 of the trough 1 are adjustably mounted on laterally extending lugs 16 carried by the supporting frame. The adjustability of these side boards 10 and 11 is accomplished by means of L-shaped brackets 12 secured to the other faces of the side boards and having their laterally extending arms 13 longitudinally slotted to receive bolts carried by the lugs 16 and which are equipped with thumb nuts 15 to facilitate the adjustment of the boards. It will thus be seen that these boards 10 and 11 may be moved toward or away from each other to accommodate vegetables of different sizes to be cut.

The cutter which is mounted at the front end of the trough consists of three knives 17, 18 and 19 carried by a bracket 20 supported on the frame of the machine, as is shown clearly in Figs. 1 and 3. The knife 17 has a laterally extending attaching arm 17$^a$ bolted to the top or cross bar of the bracket 20 as is shown clearly in Fig. 3, and extends downwardly and forwardly the direction the potatoes or other vegetables are to be carried, at an angle of about forty-five degrees and is located directly over the center of the sprocket wheel 6 which supports the front end of the chain 3. The knives 18 and 19 are made L-shaped with the short arms thereof attached to the opposite sides of the bracket, as is shown clearly in Fig. 3, and the blades project horizontally toward the center blade 17, said blades 18 and 19 each extending through a slot in the side walls of the trough or conveyor boards at right angles to the center knife 17 and are attached to said brackets by thumb nuts 18$^a$ and 19$^a$ to provide for the raising and lowering of these blades which are equipped with slots through which the bolts pass which unite them to the bracket.

It will thus be seen that the horizontal knives 18 and 19 may be adjusted up or down on bracket No. 20, and continuing in the same relation to the center blade 17 to adapt smaller or larger vegetables to be cut.

The trough 1 being open and the chain 3 of considerable length, obviously the vegetables fed and conveyed by the same may be inspected and turned to suit conditions and large quantities may be cut in a minimum amount of time and with a minimum amount of labor.

The preferred embodiment of the invention is disclosed in the drawings and set forth in the specification, but it will be understood that any modifications within the scope of the claimed invention may be made in the construction without departing from the principle of the invention or sacrificing any of its advantages.

We claim:—

1. In a cutter of the class described, a supporting structure, a trough mounted thereon, a cutter located in said trough, and an endless conveyor traveling longitudinally through said trough toward said cutter for conveying the vegetables to be cut thereto, the side walls of said trough being adjustable toward and away from each other to accommodate vegetables of different sizes.

2. In a cutter of the class described, a supporting structure, a trough mounted thereon, a cutter located in said trough, and an endless conveyor traveling longitudinally through said trough toward said cutter for conveying the vegetables to be cut thereto, the side walls of said trough being adjustable toward and away from each other to accommodate vegetables of different sizes, said cutter being also adjustable for use in connection with vegetables of different sizes.

3. In a cutter of the class described, a supporting structure, a trough mounted thereon, an endless conveyor traveling longitudinally through said trough, a cutter mounted in said trough and composed of a plurality of knives, one of which depends into the trough and extends downwardly and forwardly in the direction the vegetables are carried by the conveyor, the other knives being arranged horizontally on opposite sides of said depending knife at right angles thereto.

4. In a cutter of the class described, a supporting structure, a trough mounted thereon, an endless conveyor traveling longitudinally through said trough, a cutter mounted in said trough and composed of a plurality of knives, one of which depends into the trough and extends downwardly and forwardly in the direction the vegetables are carried by the conveyor, the other knives being arranged horizontally on opposite sides of said depending knife at right angles thereto, said horizontally disposed knives being adjustable vertically to adapt them for use in vegetables of different sizes.

5. In a cutter of the class described, a supporting structure, a trough mounted thereon, an endless conveyor traveling longitudinally through said trough, a bracket arranged over said trough and extending in a plane above it, a knife secured to the top of said bracket and projecting downwardly and forwardly into the trough, a knife attached to each side of said bracket and extending horizontally toward the center blade, said side blades extending through the walls of said trough and being vertically adjustable relatively to said center blades.

VINCENT A. GARRETT.
METHIAS W. ABTS.

Witnesses:
GEORGE C. PORTER,
H. E. PORTER.